Dec. 27, 1966  M. S. KEELER II, ET AL  3,295,135
VEHICLE SPEED MONITORING SYSTEM
Filed Oct. 19, 1964  2 Sheets-Sheet 1

INVENTORS
MINER S. KEELER II
ROBERT C. THOMPSON
BY
ATTORNEYS

Dec. 27, 1966  M. S. KEELER II, ET AL  3,295,135
VEHICLE SPEED MONITORING SYSTEM
Filed Oct. 19, 1964  2 Sheets-Sheet 2

INVENTORS
MINER S. KEELER II
ROBERT C. THOMPSON
BY
ATTORNEYS

United States Patent Office 3,295,135
Patented Dec. 27, 1966

3,295,135
VEHICLE SPEED MONITORING SYSTEM
Miner S. Keeler II, 2525 Indian Trail SE., Grand Rapids, Mich. 49506, and Robert C. Thompson, Muskegon, Mich.; said Thompson assignor to said Keeler
Filed Oct. 19, 1964, Ser. No. 404,576
21 Claims. (Cl. 343—101)

This invention relates to a vehicle monitoring system, and more particularly to a system for remotely detecting and monitoring both the speed and the identity of specific vehicles as the same move about in traffic.

In present practice, vehicle speed limits established by acts of law are enforced for the most part by patrolling police vehicles. In order to apprehend a speeder, the officers operating the police vehicles must actually see the offender and give chase, so that he may first be "clocked" to determine the rate of his speed and then be stopped by the officers so that they may prepare the necessary traffic citation and hand it to the driver. This is, of course, an inefficient and largely ineffectual method, since it presents no opportunity whatsoever for actually monitoring a particular flow of traffic, or for detecting the presence of specific violators moving within such a traffic flow. Furthermore, even when the officers are able to detect and time a particular offender, they frequently are unable to actually apprehend him, due to the sheer ponderous rush of most city traffic, which restricts and impedes the mobility of patrol cars operating within it.

This general situation has long been improved by various electronic speed measuring devices, including radar, but many of the previous problems remain, since all such devices require a pair of police officers to be in constant attendance, and the accuracy of their results are often subject to considerable suspicion. Furthermore, such devices are no more flexible than a cruising police vehicle. They must be moved from one spot to another, and they can only monitor a very short expanse of one single flow of traffic. Moreover, they do not in any manner assist in the identification or actual apprehension of an illegal operator, which still must be accomplished by individual police officers.

Other systems for remotely policing vehicles while they are in traffic have been suggested, as for example in U.S. Patent No. 2,140,918 issued to D. E. Marshall. Such systems to our knowledge are less feasible than the electrical speed measuring devices noted above, however, since they too lack flexibility, mobility, accuracy, and even precision, since instead of indicating the actual speed at which a given vehicle was traveling, these systems only indicate a particular range of speed, as for instance ten mile per hour brackets. Their very concept limited them from ever attaining greater precision, since this would require an enormous aggregation of electrical components. Moreover, the results could not even be interpreted since only the crudest sort of indicating means was provided with the devices. The greatest fault with such previous systems, however, was that they provided no way for identifying the particular vehicle whose speed was under detection, nor did they provide any means for differentiating between different vehicles traveling at approximately the same rate of speed. Thus, an officer attempting to use such a system was actually given only a warning that a violator was somewhere present, and it was up to the individual officer to find the offender and then try to apprehend him. Consequently, such devices to our knowledge were never actually used, and law enforcement agencies to the present day utilize the same individual detection methods that have long since become obsolete in view of the speed and the complexity of modern traffic.

The present invention has as its major objective the provision of a remote detecting and monitoring system which practicably and efficaciously resolves the many difficulties and limitations of the past, as indicated above. The invention provides a system which needs no personal supervision, which is inherently as precise as may be desired in a given case, which is entirely accurate, and which monitors each vehicle passing a particular point with absolute secrecy and without arousing the suspicions of the drivers.

Further major objects of the invention and advantages enjoyed through its practice include its provision of supplying a detailed identification of each individual vehicle, together with the speed at which that vehicle is traveling. With this capability of completely monitoring and identifying each vehicle in a flow of traffic, the invention clearly has great flexibility and provides complete traffic surveillance.

Yet another major object and advantage of this invention is that it automatically provides a permanent and easily readable record of the speed and identifying data for each vehicle monitored, thereby allowing the data to be analyzed at any convenient time after the making of the record, and preserving intact for evidentiary purposes proof of the traffic offense.

A still further object and a further advantage of the present invention is that the permanent record of speed and vehicle identification which it produces is, in the form most preferred, a printed, easily readable tape which needs no further deciphering, and which may quickly be read by any person of modest training and ordinary skill.

Additional objects as well as additional advantages of the present invention over those specifically enumerated above will become increasingly apparent upon consideration of the following specification and its appended claims, when taken in conjunction with the accompanying drawings which illustrate a single preferred embodiment of the invention.

The present invention is based upon the concept of providing each vehicle whose speed is to be monitored with a generator and transmitter, equipping the vehicle with an encoding system which alters the continuous output of the transmitter in accordance with the instantaneous speed of the vehicle and a predetermined set of characters which identify that particular vehicle, and locating a receiver at a plurality of strategic positions for receiving the coded transmission from each vehicle passing that position. The receiver is preferably adapted to instantly decipher the message it receives and to permanently record the deciphered speed and vehicle identification data, as by printing this information out upon a continuous paper ribbon. If desired, however, the coded message received may first be recorded in the exact form in which it is received, so that it may be replayed at a later date and deciphered whenever desired, whichever form of the invention is utilized, each vehicle passing the point where a receiver is located will be silently and secretly monitored as to speed and identification. The resulting record may be reviewed at any subsequent time, so that traffic offenders may be cited through the mails for their violations, and also so that the traffic conditions at any given point will be accurately and completely known. Thus, cities may alter and control traffic conditions in particular locations with greater accuracy and in a more thorough manner than ever before was possible.

Figures 1, 2, 3:
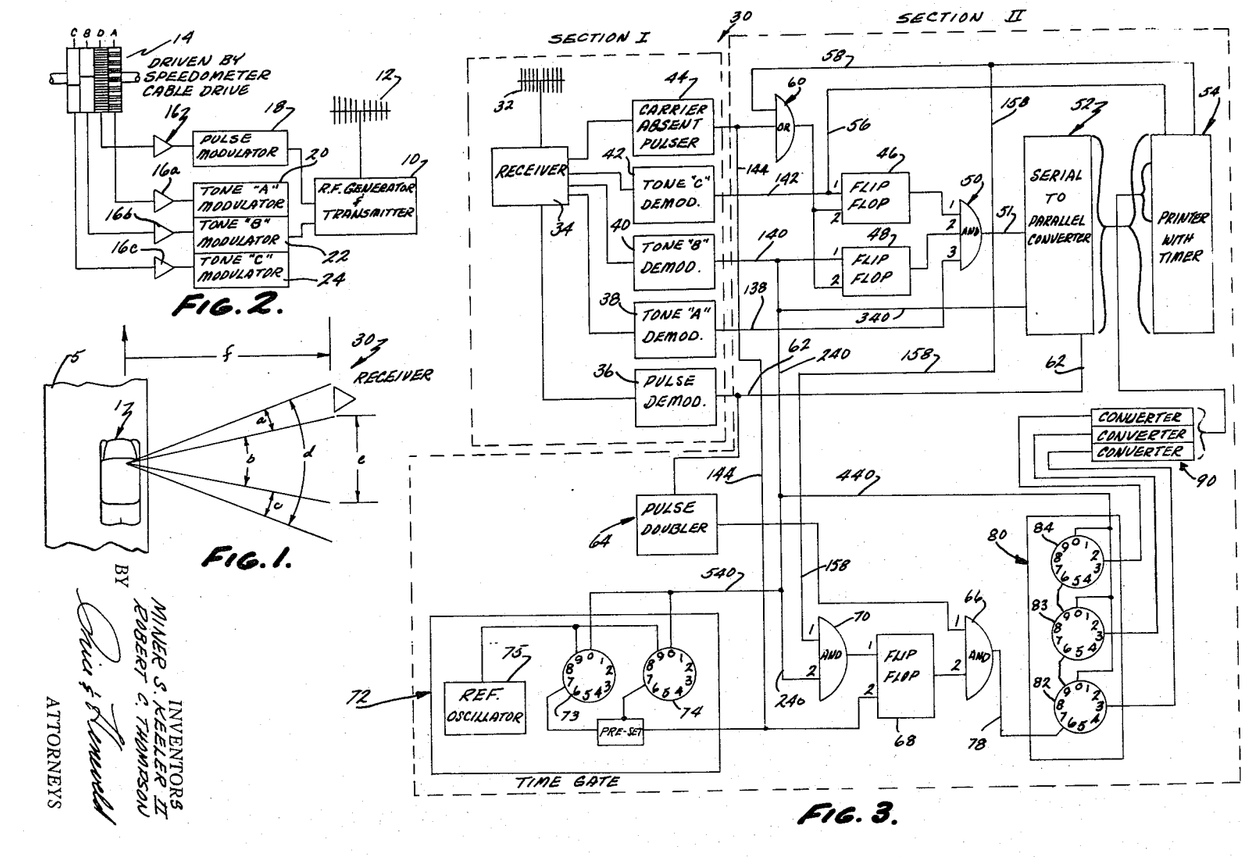
FIG. 1 is an illustrative plan view of a vehicle in traffic whose speed is being monitored by means of the present invention.
FIG. 2 is a schematic representation in block form of the transmitting portion of the system.
FIG. 3 is a schematic representation in block form of the complete receiving portion of the system.

Referring now in greater detail to the drawings, in FIG. 1 a typical environment is shown, in which a vehicle 1 is depicted traveling upon a street or other roadway 5. Located adjacent the roadway at a predetermined distance $f$ therefrom is a receiving means 30. The vehicle 1 is arranged to transmit radio signals continuously as it travels along the roadway 5. For purposes of achieving the optimum vehicle separation at the receiver 30, this transmission is preferably radiated from the vehicle by means of a beam antenna, as is known in the art, so that the cone-shaped radio wave which results does not exceed approximately ten percent. Assuming that exactly a ten percent dispersion is achieved, the total angle of the transmission from each vehicle will be thirty-six degrees, which is represented by angle $d$ in FIG. 1. Now, since the vehicle is continuously transmitting a repeating cycle of information, it may enter the reception zone of the receiver at any point during that transmission. Accordingly, two complete cycles of the transmission must be made within total angle $d$ (i.e., those represented by the sum of angles $a$, $b$ and $c$), so that the receiver will receive at least one complete transmission cycle through angle $b$ from start to finish for each vehicle which passes.

The transmission from a given vehicle is accomplished by means of apparatus such as is shown in FIG. 2. This apparatus includes basically a radio frequency generator and transmitter 10 having a beam-type antenna 12, and an encoding assembly 14 for altering the output of the transmitter 10 in accordance with a predetermined identification scheme for that particular vehicle, and also in accordance with the instantaneous speed at which the vehicle is traveling.

The preferred encoder 14 is constructed of well-known components and essentially is a rotary switching apparatus. Physically, this encoder is a series of disc-shaped segments, such as those designated A, B, C and D, which are mounted adjacent each other with a fixed interrelationship upon a common rotatable shaft, which is driven at a speed proportional to that of the vehicle, preferably by the speedometer cable of the automobile or any other like driven member whose speed of rotation is proportional to the speed of the vehicle. Each of the separate encoder segments has formed about its circumference a predetermined number of contacts or keying elements which are arranged to create a like number of electrical pulses in a predetermined sequence as the segments rotate upon their common shaft.

The particular sequence of pulses initiated by each encoder segment passes through the amplifier 16, 16a, 16b or 16c, which is coupled to that segment. Each train of amplified pulses then energizes a modulator 18, 20, 22 or 24, respectively, whose output wave produces a singular effect upon the output of the transmitter 10. More specifically, the transmitter is adapted to produce a continuous radio frequency carrier wave, which is modulated in a particular manner by each modulator. Thus, encoder segment D consists of a continuous and regular sequence of pulse producing keying elements. The resulting continuous pulse train passes through amplifier 16 and pulse modulator 18, and serves to key the transmitter 10 on and off at a regular and continuous rate proportional to the speed of the vehicle. Encoder segment A includes a particular arrangement of keying segments which when referenced against the continuous pulse train from segment D provides a coded identification train of binary zeros and ones. The pulse train from segment A passes through its amplifier 16a and energizes a tone modulator 20, which in turn amplitude modulates (or fails to amplitude modulate) certain selected pulses in the continuous train of regular RF pulses produced by the transmitter as a result of encoder segment D.

As will be subsequently explained, identification pulse train A does not require the entire number of D train pulses produced by the transmitter for each complete revolution of the encoder. Consequently, after the entire sequence of pulses modulated by tone A modulator has elapsed, a number of D pulses which are not tone A modulated are available. Encoder segments B and C are aligned with this portion of segment D, and each tone modulates at least one of these pulses at a frequency different than that of the information train, by means of tone modulators 22 and 24, respectively. That is, tone modulators 20, 22, and 24 modulate different portions of the continuously pulsating carrier wave, and they modulate their individual portions of the carrier with different tones, referred to for convenience as tone A, tone B, and tone C. In order to provide good separation between these tones at the decoder, they should differ in frequency by a reasonable amount, say perhaps ten kilocycles.

Preferably, the transmitter 10 of every vehicle operates upon the same carrier frequency, but each transmitter will have a uniformly limited range, such as for example one hundred feet. Each vehicle will continuously radiate a repeating cycle of radio transmission on this carrier frequency. Each time a vehicle passes a reception point, its transmissions will be received by a receiving apparatus 30 (FIG. 1), from the moment that the vehicle comes within range of the receiver until the moment after it has passed the receiver when it passes beyond the range of its transmitter. As previously stated, this period of time actually encompasses two complete cycles of transmission. This allows the transmitter to complete the final portion of any cycle already in progress when the vehicle enters the receiving range (represented by the angle $a$ in FIG. 1), to transmit one complete continuous cycle (represented by the angle $b$ in FIG. 1), and then to transmit the fragmentary beginning portion of the next repetitive cycle (represented by the angle $c$ in FIG. 1). Accordingly, whatever the particular relative duration of the two partial transmissions represented by angle $a$ and angle $c$, there always will be at least one complete cycle of transmission each time a vehicle passes a reception post.

The transmission from transmitter 10 in vehicle 1 passes from beam antenna 12 to the receiver antenna 32 (FIG. 3), which also is preferably of a beaming type, so as to assist in narrowing the angle of reception and thereby augment the selectivity between different vehicles. The transmission is received by a receiver means 34, which is basically of a superheterodyne nature tuned to the frequency of the carrier from transmitter 10.

It will be recalled that the carrier has been pulse-modulated in a continuous manner. Accordingly, it is passed through a pulse demodulator 36, which converts the pulse-modulated high frequency carrier to a continuous series of simple unidirectional pulses. In a somewhat similar manner, the carrier is also passed through separate demodulators 38, 40 and 42. These demodulators are tuned to tones A, B and C, respectively, and each of them produces a pulse output only during the part of the continuous pulse train that has been tone modulated with one particular tone. Thus, demodulator 38 reproduces an information train from encoder segment A, and demodulators 40 and 42 reproduce the start and stop pulses from encoder segments B and C, respectively. It will be noted that the carrier signal is also coupled to a matrix 44. This is the "carrier absent pulser," which is a triggering type of circuit of conventional design having zero output so long as the carrier is present, but which supplies a positive output pulse whenever the carrier disappears, as when a vehicle has left the reception zone.

The stop and the start signal pulses from demodulators 40 and 42 are coupled to flip-flop matrices 46 and 48, respectively, at their "set" terminals, which are designated number 1. Flip-flop matrices 46 and 48 are bi-stable triggering circuits, such as are well-known in the electronics art. Flip-flop 46 is arranged so as to set with a logical zero output, and this circuit is connected to the first terminal of a three input AND gate designated 50. Flip-flop 48 is arranged to set with a logical one output, and is connected to the second input terminal of AND gate 50. The input for the third terminal of this gate is supplied by demodulator 38, and consists of the coded information train which identifies the vehicle.

Since inputs 1 and 2 of AND gate 50 are supplied by flip-flop matrices, these will receive either a continuous and steady input or no input at all. Accordingly, AND gate 50 will either be closed altogether, or it will have an output consisting of the pulses making up information train A. This output is connected directly to a serial-to-parallel converter 52, whose purpose is to rearrange the sequential pulse train at its input with respect to time, so that the pulses do not simply appear and disappear one after another, but instead are "locked in" for a predetermined length of time in the order in which they appear. Consequently, all of the pulses will simultaneously be present in parallel form at the end of that predetermined length of time.

The serial-to-parallel converter 52 is coupled to apparatus 54 for recording whatever information is contained within the converter 52 at a predetermined time. The apparatus 54 is preferably a solid state digital printing device, such as the device presently manufactured by Monroe Calculating Machine Company, Inc., and sold under the registered trade mark "Data/Log." This device is capable of printing 17.3 lines per second containing sixteen columns or characters in each line, upon a continuous roll of paper. Each of the sixteen columns of information symbols requires a binary input of four bits, represented in FIG. 4 by the four conductors leading to each of the brackets on the input side of the printer 54. The printer further includes a timer of conventional nature, which is essentially a clock which imprints upon the roll of paper the time of day. This may be merely in the form of an indication of a particular segment of the day, or if desired, may be a more frequent function, occurring at relatively close predetermined intervals. Also, the timer may receive a signal from the printer itself which causes the timer to record the instantaneous time of the signal upon the roll of paper.

It will be noted from the figure that there are two connections to the printer in addition to those noted above. These are represented by conductors 56 and 58. Conductor 56 connects directly to the "set" input terminal of flip-flop 46 which, it will be remembered, receives from demodulator 4 the stop signal which occurs at the end of each completed cycle of transmission. It is this signal which commands the printer 54 to print out whatever information is at that moment presented to it by converter 52. Conductor 58 connects the second additional terminal of the printer to the first input terminal of a two input OR gate, designated 60. The second input of OR gate 60 is supplied by carrier-absent matrix 44, and the output of this gate connects directly to input terminal number 2 (i.e., the reset terminal), of each of the flip-flop matrices 46 and 48. From this mode of connection, it will be apparent that whenever the carrier-absent pulser 44 supplies a signal to the gate 60, or whenever a signal appears on conductor 58 from the printer 54, the gate 60 will reset each of the flip-flop matrices, thereby reversing the output which these matrices supply to AND gate 50. Since as previously stated, flip-flop 46 sets with a logical zero output while flip-flop 48 sets with a logical one output, whenever a vehicle leaves the reception zone and carrier-absent matrix 44 is actuated, or whenever the printer 54 indicates that it is ready for a new set of signals by sending a pulse down conductor 58, OR gate 60 will reset both flip-flop circuits. This results in the enabling of AND gate 50 input 1 and the disabling of input 2 of this gate.

Continuous pulse train D is connected from its demodulator 36 to the converter 52 by means of conductor 62. This train is also connected to a pulse-doubling matrix 64. The pulse doubler 64 is of conventional circuitry design, and it produces two pulses for every pulse entering it. The doubled number of pulses in the continuous train is connected from pulse doubler 64 to input number 1 of a two input AND gate designated 66. When AND gate 66 is enabled at both its input terminals, it may be seen that the doubled-pulse train will be coupled by conductor 78 to a speed counter 80, whose operation will be subsequently explained.

In order to enable both inputs of AND gate 66, however, it is also necessary to produce a logical one output from flip-flop circuit 68 connected to input number 2 of this gate, by energizing its "set" input terminal number 1. Energizing input 1 of flip-flop 68 is accomplished by another AND gate, designated 70, which has two inputs. Input number 1 of AND gate 70 is supplied by conductor 158, which may be traced upward in the circuit to the point where it joins conductor 58 which, it will be remembered, carries the printer-ready signal by which the printer 54 indicates that it is clear and receptive to new binary information. Input number 2 of AND gate 70 is supplied by conductor 240, which is connected to conductor 140, which in turn couples demodulator 40 to terminal number 1 of flip-flop 48. Accordingly, the signal which is impressed upon input 2 of AND gate 70 is that from demodulator 40, i.e., the start pulse.

In accordance with the connections just detailed to AND gate 66, flip-flop 68, and AND gate 70, it should be apparent that in order for the doubled pulses to be coupled through gate 66 to conductor 78 and the speed counter 80, the printer 54 must have indicated a ready condition, and the start signal must also have been received by AND gate 70. When these two conditions have occurred, the pulses will be connected directly to speed counter 80. Until both these conditions have occurred, however, AND gate 66 will be closed, and no pulses will be allowed to reach the counter.

It should here be noted that the carrier-absent pulser matrix 44 not only furnishes a signal to OR gate 60 whenever a vehicle has left the reception zone, but by means of conductor 144 such a signal also is coupled to input 2 of flip-flop 68. Accordingly, this flip-flop is reset each time a vehicle has left the reception zone, which causes it to produce a logical zero output and disable AND gate 66, thereby blocking any pulses from the speed counter 80. It should also be noted that reset input 2 of flip-flop 68 is not only connected to the carrier-absent pulser 44 in the manner just stated, but also is coupled to a time gate 72. Thus, it may immediately be deduced that, like carrier-absent pulser 44, time gate 72 may also cause flip-flop 68 to block pulses from speed counter 80. Furthermore, the time gate receives the start pulse from demodulator 40, in the same manner as does AND gate 70, via conductors 140, 240, and 540.

Time gate 72 is a device for repeatedly counting a predetermined length of time after receiving an initiating signal. More devices than the single one shown are known in the art for accomplishing this purpose, but a preferred one of these devices is illustrated in the figure. This device consists of a pair of cold-cathode gaseous counting tubes, such as the type which are sold under the tradename "Dekatron," here designated 73 and 74. The Dekatron tubes are driven by a reference oscillator 75 having a well regulated and continuous frequency. The Dekatron tubes are preset to provide an output signal whenever a given count has been reached. This output signal is coupled to conductor 144 (which carries the carrier-absent pulse when it is present) directly to the resetting input 2 of flip-flop 68. From the previous discussion of the operation of this flip-flop, it should now be apparent that the time gate 72 operates in the following manner. First the gate is supplied a start signal from demodulator 40, in the manner previously noted. This signal resets the Dekatron tubes to zero, from where they are driven steadily by oscillator 75, thereby counting at the predetermined rate. When the desired period of time has elapsed, the preset electrodes of the tubes are energized, thereby producing the output signal from the time gate which resets input 2 of flip-flop 68. When the flip-flop resets, it produces a logical zero output, which disables AND gate 66 and blocks further pulses from entering speed counter 80. Thus, the speed counter will always receive the number of doubled pulses which occur during the same measured period of time.

Speed counter 80, as stated, receives the continuous train of doubled pulses from pulse doubler 64, through AND gate 66, when the latter is enabled at both its input terminals. As has also been indicated, speed counter 80 also receives the start pulse from demodulator 40, via conductors 240 and 440. The speed counter itself is merely a counting apparatus of known configuration, which most preferably includes three Dekatron tubes 82, 83 and 84, which are here used to count units, tens of units, and hundreds of units, respectively. As here utilized, these Dekatron tubes count the demodulated and doubled continuous pulse train, and hence they indicate directly the speed of the vehicle being detected in miles per hour. Since a different speed will likely be indicated for each vehicle, the ten cathodes of each Dekatron (represented in FIG. 3 by single cables) are connected to one portion of a triple converting means 90. Converting means 90 in turn couples the reading from the speed counter 80 to the printer 54, so that the speed of the vehicle may be printed out upon the tape along with the other data which identifies the vehicle.

The purpose of the converter 90 is one of accommodation in the present embodiment of the invention. That is, it should be recalled that each of the sixteen inputs to the printer 54 is required to be a four-bit binary signal. Therefore, the decimal form of output from the Dekatron tubes in the speed counter 80 must somehow be converted to a binary type input, and this is accomplished by the converter 90. Such decimal-to-binary code converters are well-known within the art, and certain types utilizing a plurality of flip-flop circuits are commercially available and will satisfactorily perform the needed function here. Accordingly, this apparatus is not described in any detail here.

Figure 4:
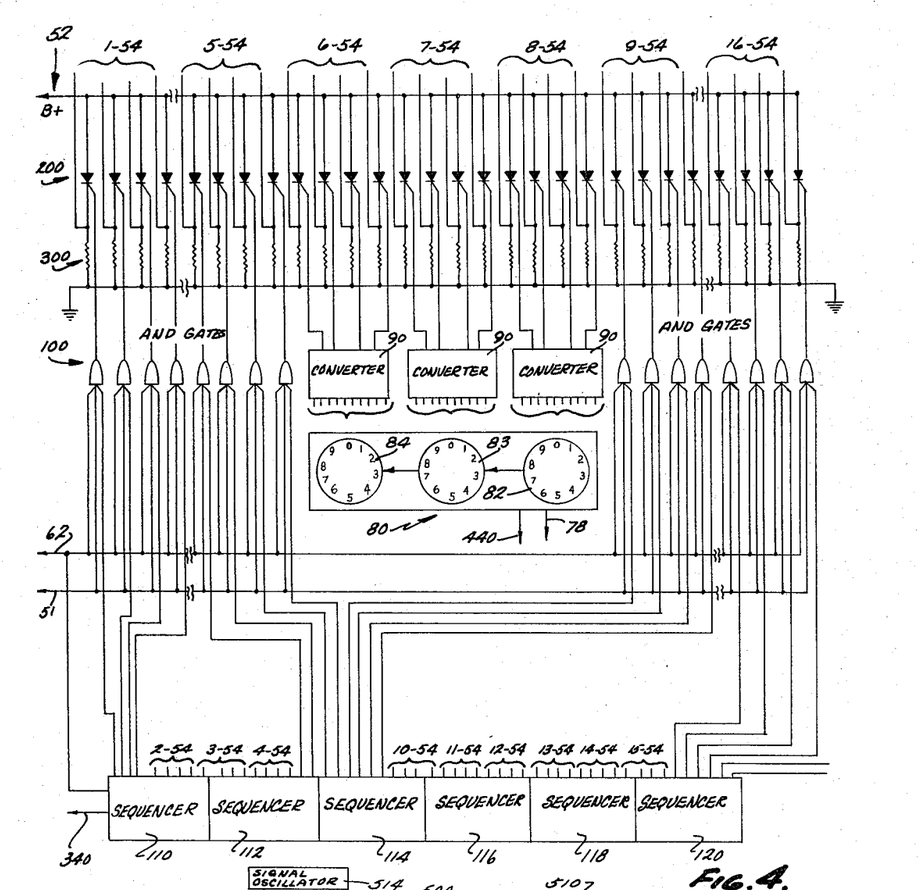
FIG. 4 is a schematic circuit diagram of the information-converting portion of the receiver.

The nature of the serial-to-parallel converter 52 is shown in detail in FIG. 4. As has been stated, the purpose of this device is to translate the information train (which serves to identify the vehicle and which is obtained from tone A and demodulator 38) from its serial form into the required binary form for the printer 54, and to "memorize" or hold the first and all succeeding binary signal until such time as the last signal becomes present and the printer prints out all of the information present. It should here be recalled that information train A consists of an intermittent series of pulses which are in synchronization with continuous pulse train D, which is coupled from demodulator 36 by conductor 62 directly into the converter 52. Accordingly, the two synchronized pulse trains convey the intelligence required to identify a given vehicle by means of a series of logical zeros and ones. These zeros and ones are formed when a pulse occurs on the A train in synchronization with a like pulse on the D train, and when no pulse appears on the A train to match that on the continuous D train, respectively.

The serial-to-parallel converter 52 of FIG. 3 is thus seen to decipher or translate the serial intelligence fed into it by performing logic upon it. Furthermore, the converter changes the serial form of the intelligence to a parallel form, as stated above. In the translating process, the converter utilizes a continuous succession of three-input AND gates, which are designated generally 100. Since the printer 54 requires four-bit binary inputs for each of the sixteen columns it prints, a total of sixty-four such binary inputs must be supplied to it. The speed signal to the printer from speed counter 80 and converter 90 occupy three columns of the printer, however, so the remaining thirteen columns, requiring fifty-two binary inputs, remain available for vehicle identification purposes. Accordingly, information train A may consist of as many as fifty-two pulses, and fifty-two of the AND gates 100 are required for performing logic with these pulses.

As seen in FIG. 4, the single (undoubled) continuous D pulse train is connected into coverter 52 directly from demodulator 38 by conductor 62, while information train A is coupled into the converter by conductor 51. Each of these two conductors has a tap from it into each of the AND gates 100, and in this manner the synchronized A and D pulse trains supply two of the three inputs to each of these gates. The third input to each gate is supplied concurrently with the presence at one input of that gate of the pulse from continuous train D, by one of the output terminals of an arrangement of sequencing devices 110, 112, 114, etc., which begin their operation upon receipt of the start pulse B, supplied to them by conductor 340.

Sequencing of the AND gates 100 may be performed in several ways known to the art, but the way that is presently envisioned in this invention is through the use of a number of Dekatron tubes which are driven by pulses from continuous train D and consequently are synchronized to this train. Each of nine cathode connections from each Dekatron forms the third input to each of the AND gates 100, while the tenth cathode connection of each Dekatron triggers the next like tube into operation. Thus, once a start signal is received by the first sequencer, each of the sequencers 110, 112, etc., in its turn will sequentially energize each of its cathode connections, in synchronization with the D pulses. As each cathode connection is energized, the third terminal of each of the AND gates 100 is sequentially enabled.

Thus, beginning at the left side of the drawings, each of the gates will be "tried" in a continuous sequence to see if its other two inputs have been enabled by the simultaneous occurrence of pulses from information train A and continuous pulse train D. Since pulses from train D are continuous, the conduction of each gate in turn is dependent only upon receipt of a pulse from the information train. When it is recalled that information train pulses occur in a definite pattern fixed by encoder segment A and designed to identify a particular vehicle, it will be seen that this predetermined pattern will be reflected in the conduction and nonconduction of AND gates 100, as they are "swept" from left to right by the sequencers.

For each AND gate 100 that is completely enabled and which consequently conducts, a voltage appears on the conductor connecting that AND gate with one of the series of control rectifiers 200, or other similar triggering components. Such voltages are used to "gate" the particular rectifiers in the group 200 which are to be energized, avalanching those rectifiers into a state of conduction. When any control rectifier is triggered and avalanched, it completes a path for current flow from a common source of supply voltage (indicated B+) through the triggered rectifier and through one of the load resistors designated generally as 300 connected thereto, to a common ground. Between each rectifier and its load resistor 300 is connected a conductor which forms one of the four inputs to each of the printer channels, which are designated 1-54, 2-54, etc., but which do not all appear in the drawing, since they are all the same. Thus, when each control rectifier 200 is gated, each conductor associated with it is impressed with an identical voltage that is developed across the load resistor 300 in the particular circuit branch of that rectifier.

It will thus be seen that if, for example, information train A begins with a pulse-present, pulse-absent, pulse-present, pulse-absent pattern, as sequencer 110 enables the first four AND gates 100 in succession, only the first and third gates will actually conduct, since although each of the four received a D pulse, only the first and third one received an A pulse. Thus, only the first and third control rectifiers 200 will be gated, and only the first and third input terminals of printer channel 1–54 will be energized. Accordingly, channel 1–54 will receive a binary input of one, zero, one, zero. This logical process is repeated in rapid succession for the first five channels of printer inputs, but since the next three channels are devoted to speed information rather than identification data, after channel 5–54 is completed, the sequencers instantly switch to channel 9–54 and continue from there through the final channel, i.e., 16–54.

As has been described previously, the speed of a vehicle passing a reception point is indicated directly by the speed counter 80 of FIG. 3, in a direct decimal read-out. It is desired that this speed be printed out by the printer 54 in a predetermined integrated program arrangement with the data identifying the vehicle. Consequently, the decimal number from the speed counter 80 must be translated into the proper binary input for the printer, and supplied to its input channels 6–54, 7–54 and 8–54, respectively. As has also been previously stated, the decimal to binary-coded-decimal converters 90 are of conventional design. Conductors from the ten cathode connections of each Dekatron tube in the speed counter 80 are supplied to each section of the converter 90, and in accordance with its mode of operation, each of these sections supplies to its associated printer input channel 6–54, 7–54 or 8–54 a four-bit binary signal representative of the decimal input which was read by speed counter 80, and supplied to the converter.

As previously indicated, and as will be described in detail subsequently, the fifty two serially-coded pulses of the A train are synchronized to the continuous D train pulses, but do not extend for so long a time as the latter. That is, there are more D pulses than there are A pulses. Also, since speed is determined by counting D pulses over a fixed time interval, the final determination of speed is not made until after the A train has completely elapsed and the vehicle has been identified. Thus, in actual operation, the converter 52 of FIG. 4 executes a continuous and steady sweeping of the first five and last eight printer input channels, and after the serial information from the train has been completely translated into binary code and locked by the control rectifiers 200 into these thirteen printer inputs, only then is the final speed determination made and fed to printer input channels 6–54 through 8–54. When the speed information has at last been given to the printer, however, the detection cycle for that particular vehicle is completed, and print-out immediately follows.

OPERATION

In discussing the operation of the present invention, it is useful to have a single concrete example to carry through the operation from start to finish. Accordingly, let it be assumed that the total transmitting angle $d$ of FIG. 1 is ten percent, i.e., 36°. Thus, the angle of one complete cycle of the transmission, as illustrated by the angle $b$, is one-half the total angle or eighteen degrees. If the distance $f$ that the vehicle 1 is away from the receiving apparatus 30 as it passes the same is then selected to be 54.4 feet, the linear distance $e$ of one complete cycle of transmission will be 18 feet. The time required to make one such transmission is the time required by the vehicle to cover this linear distance. Thus, at 60 m.p.h. this time would be approximately .20 second, while at 160 m.p.h. this time would be about .077 second. Since the response time of the electrical circuitry involved is very much faster than this, the limiting factor which establishes an upper speed limit for the present illustrative system will be the response of the printer 54, which has been stated to be approximately seventeen lines per second, or about .059 second per line. It will thus be seen that the upper limit for the preferred embodiment of the invention which is illustrated herein is well above 160 m.p.h. Consequently, that figure will be chosen as an exemplary upper limit for the system, since it is an entirely realistic maximum for present-day vehicles.

With a theoretical upper speed limit of 160 m.p.h. it would be most convenient to have 160 pulses on the continuously pulsing encoder segment D. As a practical matter, however, an encoder wheel having this many pulses is physically too large for the small, compact system presently envisioned. Accordingly, the D wheel should contain 80 pulses, which will be electronically doubled within the receiving apparatus 30, so that one pulse may still be indicative of each one mile per hour of vehicle speed. Since as has been stated, only fifty-two A train pulses are required for a complete identification of all vehicles, and since each of these fifty-two pulses is synchronized with the first fifty-two D train pulses, some twenty-eight D train pulses may be utilized for any purpose desired, as for instance for the stop and start signals which originate from encoder segments B and C.

As presently conceived, the identification of each vehicle passing through the reception zone will include two columns for indicating the make of the vehicle, two columns for indicating the year of its manufacture, one column for indicating the body style, and eight columns for indicating a coded identification number for each auto. Investigation shows that law enforcement agencies generally use the engine block number for this purpose, since it is much more readily traced than is the auto serial number. Moreover, the serial number is not a standard system for each manufacturer, as is the engine block number. The eight digit identification number envisioned by the present invention is sufficient to cover the average yearly output of all American vehicles plus the yearly import of all foreign makes. Thus, a standard numbering system of engines for all manufacturers could readily be instituted in the future using this system.

With the detected speed of a given vehicle inserted between the fifth and ninth columns of print, the entire resultant printer output for each vehicle passing the reception zone would consist of a series similar to the following: FO64S11212345678. This could easily be read by any person of the most limited ability as indicating a Ford automobile (FO) built in 1964 (64) having a sedan body style (S), traveling 112 m.p.h., and bearing the engine identification No. 12345678.

Since all of the information except the speed data is initiated by the A encoder segment, as illustrated in FIG. 2, this segment is most desirably located at one end of the common encoder shaft, so that it can be interchanged at will. The invention contemplates that each vehicle manufactured will have its own individual encoder segment A, upon which will be placed the identification data described above. All vehicles would, of course, carry identical encoder segments B, C and D.

Since the encoder of each vehicle is to undergo two complete revolutions as the vehicle passes through the reception zone, the encoder drive must vary with the speed of the vehicle. One very suitable way for driving the encoder would thus be through a gearing take-off from the speedometer shaft of the vehicle. Such a drive would clearly rotate the encoder shaft at a speed bearing a fixed relationship to the speed of the vehicle. Thus, the rotation of the encoder shaft will be proportionately faster as the speed of the vehicle increases. Therefore, the frequency of the continuous D pulses will be directly related to the speed of the vehicle, and may be used as the parameter in determining what that speed is.

As stated previously, the continuous train of pulses resulting from the pulse-modulated carrier are demodulated by matrix 36, and are fed to the serial-to-parallel converter 52 (by means of conductor 62). These pulses are also coupled to the pulse doubler 64, and they pass through AND gate 66 to the speed counter 80, where they are used to drive the counting tubes 82, 83, and 84. Upon receipt of the start signal B from demodulator 40 via conductors 240 and 540, time gate 72 begins to run at the rate at which it is driven by reference oscillator 75. Since a theoretical maximum velocity of 160 m.ph. has been chosen, and since a single cycle of transmission at this speed requires .077 second, if the reference oscillator 75 operates at a frequency of one kilocycle when time gate 72 has counted to 77, it will have precisely measured the period of time needed for the speed counter 80 to count exactly the number of doubled D train pulses which indicate the correct speed of the vehicle. Thus, the Dekatron tubes 73 and 74 within time gate 72 are preset at 77, and when they reach this count (i.e., when they have counted .077 second after receipt of start pulse B) the time gate sends a positive voltage directly to input 2 of flip-flop 68. This voltage resets this flip-flop, causing a zero output which disables AND gate 66 and by so doing prevents speed counter 80 from receiving any further pulses.

Thus, whatever the rate of speed is with which a vehicle passes through the reception zone, each time a vehicle does enter the zone it causes a start pulse which actuates time gate 72. This gate in turn allows speed counter 80 to count pulses for the predetermined time interval, during which it counts as many D pulses as correctly indicate the speed of the vehicle. From this it should appear that each D train pulse actually does represent one mile per hour. However, since encoder segment D contained only eighty pulses which were subsequently doubled by matrix 64, the precision of the entire speed counting circuitry is plus or minus one mile per hour.

As a vehicle enters the reception zone for the first time, it most likely will do so part way through one of its cycles of transmission, as is indicated by the different angles of FIG. 1. During such a condition, the receiver 30 of FIG. 3 operates as follows.

The basic receiving apparatus 34 of the system is continuously operative, and consequently the conclusion of the transmission already in progress when the vehicle entered the reception zone is received in the usual manner. Such a fragmentary transmission will always consist of a continuous and regular sequence of the pulse-modulated carrier frequency. The pulse modulated carrier may or may not be amplitude modulated as well, depending upon whether the entire information train A has yet been competed. Consequently, whenever any vehicle is in the reception zone, pulse demodulator 36 will always produce continuous D train pulses, which enter the serial-to-parallel converter 52 and also the pulse-doubling matrix 64.

Assuming that some portion of the information train is present in the fragment of transmission received, demodulator 38 will also produce a series of information pulses, which will be presented to input 3 of AND gate 50. These information train pulses will be unable to pass through AND gate 50, however, since when the last previous vehicle left the reception zone, the carrier-absent matrix 44 produced a signal which passed through OR gate 60 to reset flip-flops 46 and 48, thereby enabling input 1 of AND gate 50 but disabling terminal 2 thereof, thereby maintaining this gate in a closed condition. Furthermore, D train pulses from pulse doubler 64 are prevented from entering the speed counter 80, since like AND gate 50, AND gate 66 has also been disabled by the carrier-absent pulse, which is applied to its input number 2 as a result of flip-flop 68 having been reset by the pulse, connected to the flip-flop from the pulser matrix by conductor 144. Consequently, although a signal is received by the receiving apparatus 30, neither the serial-to-parallel converter 52 nor the speed counter 80 is operative.

This operation of the receiving apparatus 30 continues until the vehicle begins to transmit a new cycle of transmission, represented by the angle b in FIG. 1. When the new cycle of transmission begins, demodulating matrix 40 detects the presence of tone B and produces a start pulse. This sets flip-flop 48, which then enables input 2 of AND gate 50. Since flip-flop 46 remains in its reset condition, like flip-flop 48, it also produces a logical one output, which enables input 1 of AND gate 50. Consequently, the information train now produced by demodulator 38 enables input 3 of AND gate 50, and passes directly into the serial-to-parallel converter 52, which has also received the start pulse upon conductor 340 and therefore has simultaneously initiated the sequential enabling of AND gates 100 (seen in FIG. 4).

Pulses of continuous train D once again are presented to the converter 52 by conductor 62, and consequently the logical deciphering of information train A by comparing it to continuous train D as a reference gets under way through AND gates 100, with the resultant deciphered information being "locked in" upon the input channels 1–54, etc., of the printer 54 by control rectifiers 200 (FIG. 4).

Once again, a continuous pulse train leaves pulse doubler 64, and is presented to input 1 of AND gate 66. This time the carrier-absent pulser 44 is inactive, and consequently flip-flop 68 is not held in a reset condition. On the contrary, demodulator 40 has coupled its start pulse to input 2 of AND gate 70 upon conductor 240, while the printer-ready signal from conductor 58 has been coupled to input 1 of the same gate by conductor 158. Consequently, AND gate 70 is completely enabled, and it sets flip-flop 68, thereby producing a logical one output which enables input 2 of AND gate 66. Since input 1 of the gate is already enabled by the doubled pulse train, the pulse train is free to pass directly into the speed counter 80.

Demodulator 40 has also coupled its start pulse into time gate 72 by means of conductors 140, 240, and 540. This has reset the counting Dekatrons 73 and 74 within the gate, and they are driven by reference oscillator 75 through their usual counting cycle. It will be recalled that the conclusion of this counting cycle is attended by the presence of a voltage which is fed directly into input 2 of flip-flop 68, which resets this flip-flop and disables AND gate 66, thereby preventing any further doubled pulses from being admitted to the speed counter and ending its count.

Thus, as the vehicle proceeds past the reception station and passes through the reception zone, from the moment a start pulse is received by the receiving apparatus 30, the information train A goes through the logical deciphering process described, locking in a binary input to each of the thirteen printer columns used for vehicle identification. At the same time, a quantity of pulses from continuous train D will be counted by speed counter 80. Since the frequency of the pulses in train D is directly related to the speed of the vehicle, and since time gate 72 always allows the speed counter 80 to count for the same period of time, the speed of the vehicle will be determined at the instant that the speed counter stops, and at this time its decimal input is converted into binary by the converter 90 and supplied to printer channels 6–54, 7–54 and 8–54.

The data presented to each of the printer channels thus cannot be varied once it has been locked into position, so long as control rectifiers 200 are in conduction and so long as the speed counter 80 is disabled in the manner described. Accordingly, the remainder of that cycle of transmission (if any) is completed without further effect upon the system. When the cycle is completely over, demodulator 42 detects upon the final pulse of carrier frequency the tone for which it is tuned and produces a stop signal. This signal immediately is impressed upon input 1 of flip-flop 46, setting this flip-flop and producing a logical zero output which disables input 1 of AND gate 50 and prevents any further information whatever from passing into the converter 52. The stop signal also is coupled by conductor 56 directly to the printer 54, where it commands the printer to print out the message then contained in the binary signal locked into its various inputs, which it immediately does.

During the small fraction of a second that the printer is printing, the next cycle of transmission from the same vehicle (represented by angle c in FIG. 1) begins. From the foregoing description, it might be expected that the receiving apparatus 30 would be activated by the newly incoming start pulse which occurs at the outset of the new fragment of transmission. Indeed, this would occur except for the fact that the new start pulse occurs directly after the stop pulse of the previous transmission. Consequently, the new start pulse occurs during the precise instant that the printer is printing, during which the printer does not produce the printer-ready signal upon conductor 58 which would reset flip-flop 46 and allow information pulses to pass through AND gate 50. Also, since the carrier frequency of the vehicle's transmitter has continuously been present, the carrier-absent pulser 44 has never been actuated, and so it cannot have reset flip-flop 46. Therefore, the two flip-flop matrices remain in their previous condition, in which flip-flop 46 was set by the stop tone from demodulator 42, and its logical zero output under this condition continuously disables input 1 of AND gate 50. Thus, the new fragmentary cycle of information train pulses does not pass through the converter 52. Also, although the new start pulse was received at input 2 of AND gate 70, the printer-ready signal from conductors 58 and 158 did not occur and so was not present at input 1 of AND gate 70 at the instant that the start pulse was present at input 2 of this gate. Thus, this gate is not enabled and flip-flop 68 remains in its previous condition, wherein it was reset by the voltage from time gate 72, disabling input 2 of AND gate 66 and preventing new train D pulses from passing through to the speed counter 80. Accordingly, the receiving apparatus 30 remains in a quiescent and inactive condition during a fragmentary initial portion of a transmission (angle c in FIG. 1) which follows directly after a complete cycle of transmission (angle b) has been received.

The vehicle whose velocity has just been received and whose identity has been decoded now leaves the reception zone, and consequently the carrier-absent pulser 44 produces its signal, even though the gap between vehicles may be only the tiniest fragment of a second. Once again, this signal (and the printer-ready signal which now also is present) resets flip-flops 46 and 48 through OR gate 60. This causes flip-flop 46 to enable input 1 of AND gate 50 and causes flip-flop 48 to disable input 2 of AND gate 50, preparatory to the receipt of a start signal from a new transmission. The printer-ready signal from conductor 58 is also coupled (by conductor 158) to input 1 of AND gate 70, so that when the new start signal is received at the second input of this gate, flip-flop 68 will be set and gate 66 enabled. Until a start signal is received, however, the pulse from carrier-absent matrix 44 is impressed upon input 2 of flip-flop 68, thereby holding it in a reset condition which disables input 2 of AND gate 66, thereby preventing the speed counter from being actuated. In this condition the entire cycle of detection has been completed, and the receiving system 30 awaits the arrival of the next vehicle and the new start pulse of the first complete cycle of transmission from that vehicle.

It may be that instead of having a separate complete receiving apparatus 30 (FIG. 3) at each traffic monitoring station, it will be desired in certain situations to have only some means of receiving the incoming speed and identification signals and recording them in substantially the form received, so that all or most of the deciphering may be done at a later time. In this manner smaller municipalities and others having limited traffic or desiring only limited surveillance of particular streets could realize certain economics, since they would require fewer complete receivers containing deciphering apparatus as well.

Figure 5:
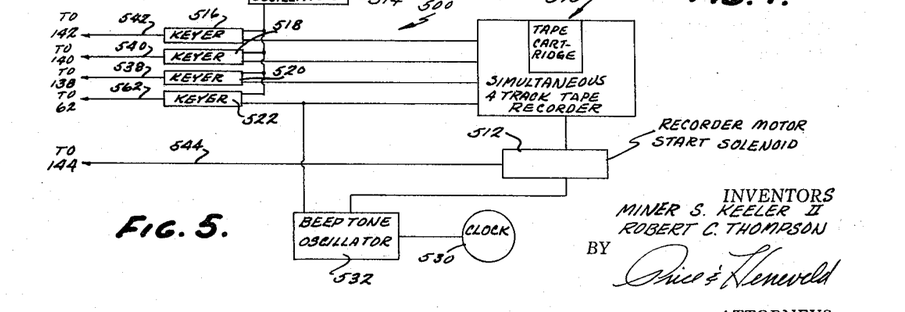
FIG. 5 is a schematic representation in block form of apparatus for use with the invention in an additional embodiment thereof.

Such a system is provided by using only that portion of the system of FIG. 3 which is designated "Section I," and connecting it to the recording system 500 shown in FIG. 5, in the manner there indicated. The recording system 500 preferably includes basically a multiple-channel magnetic tape recorder 510 having at least four tracks which may be operated simultaneously. The recorder 510 preferably is actuated by a start solenoid 512 connected thereto upon the cessation of signals from the carrier-absent matrix 44 (FIG. 3), to which the solenoid is connected by conductors 144 and 544, as shown.

The four inputs to the recorder 510 are provided from a common or master signal oscillator 514, in a manner determined by four separate switching matrixes which are labeled "keyer" and designated 516, 518, 520 and 522, through which signals from the master oscillator 514 must pass in order to reach the respective separate recorder inputs to which the keyers are connected. Further, keyer 516 is connected by its lead 532 to conductor 142, and hence to tone C demodulator 42 of FIG. 3; keyer 518 is connected by its lead 540 to conductor 140, and hence to tone B demodulator 40; keyer 520 is connected by its lead 538 to conductor 138, and hence to tone A demodulator 38; and keyer 522 is connected by its lead 562 to conductor 62, and hence to the pulse demodulator 36.

Finally, the recording system 500 includes a clock 530 of the type which provides a signal at predetermined intervals. The clock 530 is connected to a "beep" tone oscillator 532 which it actuates at the end of each of the said predetermined intervals. The beep tone oscillator in turn is connected to one of the inputs to recorder 510, preferably by the lead from keyer 522, as shown.

The operation of this modified version of the invention should be quite clear from the foregoing description of its circuitry. While no vehicle is within the reception zone, carrier absent matrix 44 continues to provide a signal, which energizes solenoid 512 and keeps the recorder motor turned off, so as to prevent the usage of unnecessary lengths of tape. When a vehicle enters the reception zone, the signal from this matrix ceases and the solenoid causes the drive motor in the recorder to begin to run, thereby moving tape past its recording heads. It will be remembered that the carrier signal is generally present some brief time before the "start" signal is actually received and a complete cycle of transmission begun. Consequently, there may be some duplication in the recording, but in this manner the recording of at least one complete transmission is assured.

Once the recorder motor is turned on, pulses from the signal generator 514 will be recorded upon the separate channels on the tape in whatever manner the keyers 516, 518, 520 and 522 are actuated. Since these devices are connected to and controlled by the four demodulators 42, 40, 38 and 36, respectively, it is clear that what is recorded upon each track is a series of pulses of alternating voltage of the frequency of the oscillator 514, whose pulse width and frequency of occurrence is precisely that of the demodulated A, B, C and D pulse trains leaving the demodulators. Thus, an exact duplicate of the transmitted message has been obtained, and it may be deciphered and printed out in the manner previously explained by replaying the four track tape on appropriate equipment, passing these signals through four separate demodulators, and then connecting them to that part of the circuit of FIG. 3 labeled "Section II." This of course may readily be done at a central station, such as police headquarters.

The clock 530 and beep tone oscillator 532 provides an optional feature to this system. The clock is started at the time a fresh tape is placed in the recorder, which time is recorded. At each interval for which the clock is set, the beep tone oscillator will be actuated and such a tone recorded on the tape. Thus, the flow of traffic during various parts of the day may be accurately known, and also a relatively accurate time will be known for each speed violation which occurs.

It will be appreciated by those skilled in the art that the use of the keyers 516, 518, 520 and 522 and the master oscillator 514 in connection with the D.C. pulses from the various demodulators is desirable chiefly due to present limitations in the frequency response of magnetic tape systems, which the frequency of modulating tones A, B or C may exceed. Should these limitations be overcome, then in that case the output from receiver means 34 could be recorded directly upon the tape, and substantially all of the demodulating and deciphering done at headquarters.

Having now carefully and completely described the structural details and circuitry of the inventive vehicle speed detecting system, as well as the particularities of its operation, it may be that specific modifications and variations of the preferred embodiment illustrated and described hereon will occur to those skilled in the art upon becoming familiar with the present description. All such modifications and variations as incorporate the spirit of this invention and are based upon the inventive concept underlying it are to be considered as falling within the purview of the claims appended herebelow, unless they by their specific language state otherwise.

We claim:

1. A method of remotely determining the instantaneous speed of specific motor vehicles moving among other vehicles in traffic upon a roadway, comprising the steps of: equipping each such motor vehicle with a transmitter; altering the output of said transmitter in accordance with the instantaneous speed of the vehicle; restricting the zone of transmission of said output to a wedge-shaped beam aimed at a predetermined direction away from said vehicle to a particularly positioned receiver adjacent said roadway; and deciphering said output to determine the instantaneous speed of said specific motor vehicle.

2. A method of remotely determining the instantaneous speed and the identity of specific motor vehicles moving among other vehicles in traffic upon a roadway, comprising the steps of: equipping each such motor vehicle with a transmitter; altering the output of said transmitter in accordance with both the instantaneous speed of the vehicle and a predetermined set of vehicle-identifying indicia; restricting the zone of transmission of said output to a wedge-shaped beam aimed at a predetermined direction away from said vehicle to a particularly positioned receiver adjacent said roadway; and deciphering said output to determine both the instantaneous speed of the motor vehicle and its identity.

3. A method of remotely determining the speed and the identity of specific motor vehicles moving among other vehicles in traffic upon a roadway, comprising the steps of: equipping each such motor vehicle with a transmitter; altering the output of said transmitter in accordance with both the instantaneous speed of the vehicle and a predetermined set of vehicle-identifying indicia; restricting the zone of transmission of said output to a wedge-shaped beam aimed at a predetermined direction away from said vehicle to a particularly positioned receiver adjacent said roadway; deciphering said output at said receiver to determine both the said speed and the identity of said vehicle; and recording said determined speed and identity at said receiver to form a permanent record thereof.

4. A method of remotely determining the speed and the identity of specific motor vehicles moving among other vehicles in traffic upon a roadway, comprising the steps of: equipping each such motor vehicle with a transmitter; altering the output of said transmitter in accordance with both the instantaneous speed of the vehicle and a predetermined set of vehicle-identifying indicia; restricting the zone of transmission of said output to wedge-shaped beam aimed at a predetermined direction away from said vehicle to a particularly positioned receiver adjacent said roadway; deciphering said output at said receiver to determine both the speed and the identity of said vehicle; and printing out directly at said receiver a word-form record of said determined speed and identity to form a permanent and readable record thereof.

5. A method of remotely determining the instantaneous speed and the identity of specific motor vehicles moving among other vehicles in traffic upon roadway, comprising the steps of: equipping each such motor vehicle with a transmitter; altering the output of said transmitter in accordance with both the instantaneous speed of the vehicle and a predetermined set of vehicle-identifying indicia; restricting the zone of transmission of said output to a wedge-shaped beam containing two complete cycles of the said speed and identification transmission; aiming said beam at a predeterminted direction away from said vehicle to a particularly positioned receiver adjacent said roadway; and deciphering at least one of said cycles of said output to determine both the instantaneous speed of the said motor vehicle and its identity.

6. A method of remotely determining the speed and the identity of specific motor vehicles moving among other vehicles in traffic upon a roadway, comprising the steps of: equipping each such motor vehicle with a transmitter; altering the output of said transmitter in accordance with both the instantaneous speed of the vehicle and a predetermined set of vehicle-identifying indicia; restricting the zone of transmission of said output to a wedge-shaped beam containing two complete cycles of the said speed and identification transmission; aiming said beam at a predetermined direction away from said vehicle to a particularly positioned receiver adjacent said roadway; deciphering at least one of said cycles of said output at said receiver to determine both the speed and the identity of said vehicle; and recording said determined speed and identity to form a permanent record thereof.

7. Apparatus for remotely determining the instantaneous speed and identity of specific motor vehicles moving among other vehicles in traffic upon a roadway, comprising: transmitter means installed upon each such vehicle; means for altering the output signals from said transmitter in accordance with both the instantaneous speed of said vehicle and a predetermined set of vehicle-identifying indicia; a receiver located adjacent said roadway for receiving said transmitter output while said vehicle moves past said receiver; said transmitter having an output which is restricted to a wedge-shaped beam aimed at a predetermined direction away from said vehicle to ensure the individual receipt by said receiver as said vehicle passes the same of the output of that particular transmitter; said wedge-shaped beam output encompassing two complete cycles of the said vehicle speed and identification transmission; and means for deciphering at least one cycle of said beamed output to determine therefrom the said speed and identity of said specific motor vehicle.

8. Apparatus for remotely determining the instantaneous speed of specific motor vehicles moving among other vehicles in traffic upon a roadway, comprising: transmitter means installed upon each such vehicle; means for altering the output of said transmitter in accordance with the instantaneous speed of said vehicle; a receiver remote from said vehicle and adjacent said roadway for receiving said transmitter output while said vehicle moves past said receiver; said transmitter having an output which is restricted to a wedge-shaped beam aimed at a predetermined direction away from said vehicle to ensure the individual receipt by said receiver as said vehicle passes the same of the output of that particular transmitter; and means for deciphering the received output and determining therefrom the instantaneous speed of said specific vehicle.

9. Apparatus for remotely determining the instantaneous speed and identity of specific motor vehicles moving among other vehicles in traffic upon a roadway, comprising: transmitter means installed upon each such vehicle; means for keying said transmitter on and off in accordance with the said speed of said vehicle, thereby pulsing its output; means for modulating said pulses with a predetermined set of vehicle identifying signals; a receiver located adjacent said roadway for receiving said transmitter output while said vehicle moves past said receiver; said transmitter having an output which is restricted to a wedge-shaped beam aimed at a predetermined direction away from said vehicle to ensure the individual receipt by said receiver as said vehicle passes the same of the said output of that particular transmitter; and means for deciphering the received output and determining therefrom the said instantaneous speed and the identity of the said specific vehicle.

10. Apparatus for remotely determining the instantaneous speed and identity of specific motor vehicles moving among other vehicles in traffic upon a roadway, comprising: transmitter means installed upon each such vehicle; means for altering the output of said transmitter in accordance with both the instantaneous speed of said vehicle and a predetermined set of vehicle-identifying indicia; a receiver remote from said vehicle and adjacent said roadway for receiving said transmitter output while said vehicle moves past said receiver; said transmitter output which is restricted to a wedge-shaped beam aimed at predetermined direction away from said vehicle to ensure the individual receipt by said receiver as said vehicle passes the same of the output of that particular transmitter; and means for deciphering the received output and determining therefrom the instantaneous speed and the identity of said specific vehicle.

11. Apparatus for remotely determining both the instantaneous speed and the identity of specific motor vehicles moving among other vehicles in traffic upon a roadway, comprising: transmitter means installed upon each such vehicle; means for altering the output of said transmitter in accordance with both the instantaneous speed of said vehicle and a predetermined set of vehicle-identifying indicia; a receiver remote from said vehicle and adjacent said roadway for receiving said transmitter output while said vehicle moves past said receiver; said transmitter having an output which is restricted to a wedge-shaped beam aimed at a particular direction away from said vehicle to ensure the individual receipt by said receiver as said vehicle passes the same of the output of that particular transmitter; means for deciphering the received ouput at said receiver to determine therefrom both the said speed and the identity of said vehicle; and recording means coupled to said deciphering means for making a permanent record of said determined speed and identity.

12. Apparatus for remotely determining the instantaneous speed and identity of specific motor vehicles moving among other vehicles in traffic upon a roadway comprising: transmitter means installed upon each such vehicle; an encoding means installed upon each such vehicle and driven at a rate of speed proportioned to said speed of the vehicle, for keying said transmitter on and off in accordance with the said instantaneous vehicle speed, thereby pulsing said transmitter output accordingly; modulator means for modulating said transmitter pulses; said encoder means in each vehicle being further arranged to key said modulator means in a unique predetermined pattern which identifies the particular vehicle; a receiver remote from said vehicle and adjacent said roadway for receiving said modulated pulse transmitter output while said vehicle moves past said receiver; said transmitter having an output which is restricted to a wedge-shaped beam aimed at a particular direction away from said vehicle to ensure the individual receipt by said receiver as said vehicle passes the same of the output of that particular transmitter; and means for deciphering the received output and determining therefrom the said instantaenous speed and the identiy of the said specific vehicle.

13. A method of remotely determining the instantaneous speed and the identity of specific motor vehicles moving among other vehicles in traffic upon a roadway, comprising the steps of: equipping each such motor vehicle with a transmitter; keying said transmitter on and off in accordance with the instantaneous speed of said motor vehicle, thereby pulsing its output; tone modulating the amplitude of said output pulses with a predetermined set of vehicle-identifying signals; restricting the zone of transmission of said output to a wedge-shaped beam aimed at a predetermined direction away from such vehicle to a receiver positioned adjacent said roadway; and recording said output in order to subsequently determine both the instantaneous speed of such motor vehicle and its identity.

14. A method of remotely determining the speed and the identity of specific motor vehicle moving among other vehicles in traffic upon a roadway, comprising the steps of: equipping each such motor vehicle with a transmitter; keying said transmitter on and off in accordance with the speed of said motor vehicle, thereby pulsing its output; modulating said output pulses with a predetermined set of vehicle-identifying signals; restricting the zone of transmission of said output to a wedge-shaped beam aimed at a predetermined direction away from such vehicle to a receiver positioned adjacent said roadway; recording said output at said receiver in order to store said speed and identification information; and subsequently replaying and deciphering said recorded output to determine both the said speed and the identity of said motor vehicle.

15. Apparatus for remotely determining the instantaneous speed of specific motor vehicles moving among other vehicles in traffic upon a roadway, comprising: transmitter means installed upon each such vehicle; means for altering the output of said transmitter in accordance with the instantaneous speed of said vehicle; a receiver remote from said vehicle and adjacent said roadway for receiving said transmitter output while said vehicle moves past said receiver; said transmitter having an output which is restricted to a wedge-shaped beam aimed at a particular direction away from said vehicle to ensure the individual receipt by said receiver as said vehicle passes the same of the output of that particular transmitter; and means for recording the received output to store said speed information so that the instantaneous speed of said specific vehicle may subsequently be determined.

16. A method of remotely determining the identity of particular motor vehicles moving among other vehicles in traffic upon a roadway, comprising the steps of: equipping each such motor vehicle with a transmitter; altering the output signals from said transmitter in accordance with a predetermined repetitive series of modulations representative of the identity of that individual vehicle; restricting the zone of transmission of the said altered output to a wedge-shaped beam; aiming said beam at a predetermined direction away from said vehicle to a remote receiver positioned adjacent said roadway to receive said restricted transmission as the vehicle passes the receiver; deciphering said received output to determine the identity of the vehicle by said series of modulations; and recording the identifying information of said modulations to form a permanent record thereof.

17. Apparatus for remotely determining the identity of particular motor vehicles moving among other vehicles in traffic upon a roadway, comprising: transmitter means installed upon each such vehicle; means for altering the output signals from said transmitter in accordance with a predetermined repetitive series of indicia representative of the identity of that particular vehicle; a receiver remote from said vehicle and adjacent said roadway for receiving said altered output while said vehicle moves past said receiver; said transmitter having an output which is restricted to a wedge-shaped beam aimed at a particular direction away from said vehicle to ensure the individual receipt by said receiver as said vehicle passes the same of the output of that particular transmitter; means for deciphering the received output to determine the identity of the said vehicle by said series; and recording means coupled to said deciphering means for making a permanent record of the identification information of said series.

18. Apparatus for remotely determining the instantaneous speed and identity of specific motor vehicles moving among other vehicles in traffic upon a roadway, comprising: transmitter means installed upon each such vehicle; means for altering the output of said transmitter in accordance with both the instantaneous speed of said vehicle and a predetermined set of vehicle-identifying indicia; a receiver remote from said vehicle and adjacent said roadway for receiving said transmitter output while said vehicle moves past said receiver; said transmitter having an output which is restricted to a wedge-shaped beam aimed at a particular direction away from said vehicle to ensure the individual receipt by said receiver as said vehicle passes the same of the output of that particular transmitter; and means for recording the received output to store said speed and vehicle identifying information so that the same may subsequently be deciphered to determine the instantaneous speed and the identity of said specific vehicle.

19. Apparatus for remotely determined the identity of particular motor vehicles moving among other vehicles in traffic upon a roadway, comprising: transmitter means installed upon each such vehicle; an encoding means installed upon each such vehicle for repetitively altering the output signals from said transmitter in accordance with a predetermined series of indicia representative of the identity of that particular vehicle; receiver remote from said vehicle and adjacent said roadway for receiving said altered output while said vehicle moves past said receiver; said transmitter having an output which is restricted to a wedge-shaped beam aimed at a particular direction away from said vehicle to ensure the individual receipt by said receiver as said vehicle passes the same of the output of that particular transmitter; means for deciphering the received output to determine the identity of the said vehicle by said series; recording means coupled to said deciphering means for making a permanent record of the identification information of said series; and a timing means coupled to and associated with the said recording means for causing a symbolic signal representative of the time of day said vehicle was identified to be impressed upon said permanent record with said identification information.

20. Apparatus for remotely determining the instantaneous speed and identity of specific motor vehicles moving among other vehicles in traffic upon a roadway, comprising: transmitter means installed upon each such vehicle; an encoding means installed upon each such vehicle and driven at a rate of speed proportioned to said speed of the vehicle, for keying said transmitter on and off in accordance with the said instantaneous vehicle speed, thereby pulsing said transmitter output accordingly; modulator means for modulating said transmitter pulses; said encoder means in each vehicle being further arranged to key said modulator means in a unique predetermined pattern which identifies the particular vehicle; a receiver remote from said vehicle and adjacent said roadway for receiving said modulated pulse transmitter output while said vehicle moves past said receiver; said transmitter having an output which is restricted to a wedge-shaped beam aimed at a particular direction away from said vehicle to ensure the individual receipt by said receiver as said vehicle passes the same of the output of that particular transmitter and means for recording the received output to store said speed and vehicle-identifying information so that the same may subsequently be deciphered to determine the instantaneous speed and the identity of said specific vehicle.

21. Apparatus for remotely determining the instantaneous speed and identity of specific motor vehicles moving among other vehicles in traffic upon a roadway, comprising: transmitter means installed upon each such vehicle; an encoding apparatus installed upon each such vehicle and driven at a rate of speed proportioned to that of the vehicle, said encoder having four different keying portions; a pulse modulator associated with said transmitter and said encoder such that one of said keying portions actuates said pulse modulator to pulse the output of said transmitter in accordance with the said vehicle speed; first, second and third tone modulators having different output frequencies associated with said transmitter and said encoder such that each of the other three of said keying portions actuates one of the tone modulators to modulate certain of said transmitter output pulses; one of the said other encoder keying portions being arranged to key one of said tone modulators in a unique predetermined pattern which identifies the particular vehicle; each of the remaining two of said other keying portions arranged to key one of the other two tone modulators at predetermined start and stop points during said pulse transmission; means for separately demodulating all of said tones from said pulses; means for demodulating said pulse modulations; said transmitter having an output which is restricted to a wedge-shaped beam aimed at a particular direction away from said vehicle to ensure the individual receipt by said receiver as said vehicle passes the same of the output of that particular transmitter; and means for recording all of the said demodulations in order to preserve them intact so that they may subsequently be deciphered to determine the instantaneous speed and the identity of said specific vehicle.

References Cited by the Examiner

UNITED STATES PATENTS

| 1,996,869 | 4/1935 | Hyland | 343—112 |
| 3,208,064 | 9/1965 | Morrel | 343—112.4 X |

References Cited by the Applicant

UNITED STATES PATENTS

| 2,140,918 | 12/1938 | Marshal. |
| 2,421,106 | 5/1947 | Wight et al. |
| 2,524,494 | 10/1950 | Wood et al. |
| 2,554,893 | 5/1951 | Brunn. |
| 2,632,152 | 3/1953 | Smith. |
| 2,927,321 | 3/1960 | Harris. |
| 3,067,417 | 12/1962 | Harding. |

CHESTER L. JUSTUS, *Primary Examiner.*

R. D. BENNETT, *Assistant Examiner.*